United States Patent [19]
McDonald

[11] Patent Number: 5,444,936
[45] Date of Patent: Aug. 29, 1995

[54] TROLLING UNIT

[75] Inventor: Donald McDonald, 3375 Maple Rd., Wixom, Mich. 48393

[73] Assignee: Donald McDonald, Walled Lake, Mich.

[21] Appl. No.: 108,068

[22] Filed: Aug. 17, 1993

Related U.S. Application Data

[63] Continuation of Ser. No. 939,613, Sep. 2, 1992, abandoned.

[51] Int. Cl.⁶ ............................................. A01K 91/00
[52] U.S. Cl. ................................... 43/42.74; 43/43.12
[58] Field of Search ............................ 43/42.74, 43.12

[56] References Cited

U.S. PATENT DOCUMENTS

| | | |
|---|---|---|
| 14,587 | 4/1856 | Smith . |
| 175,949 | 4/1876 | Dixon . |
| 1,251,810 | 1/1918 | Oehler . |
| 2,201,351 | 5/1940 | Skoverski . |
| 2,234,588 | 3/1941 | Cope .................................. 43/42.74 |
| 2,492,638 | 12/1949 | Hickson ............................. 43/42.74 |
| 2,592,741 | 4/1952 | Ristine .............................. 43/42.74 |
| 2,733,536 | 2/1956 | Terazono ........................... 43/42.74 |
| 2,759,290 | 8/1956 | Strausser ........................... 43/42.74 |
| 2,799,115 | 7/1957 | Reus ................................. 43/42.74 |
| 2,814,901 | 12/1957 | Surter ............................... 43/42.74 |
| 2,988,395 | 6/1961 | Rogers . |
| 3,057,108 | 10/1962 | Jacoben ............................. 43/43.12 |
| 3,646,700 | 3/1972 | Pond ................................. 43/42.74 |
| 3,744,178 | 7/1973 | Denny ............................... 43/42.74 |
| 3,939,595 | 2/1976 | Lockett ............................. 43/43.12 |
| 3,991,505 | 11/1976 | Simeti ............................... 43/43.12 |
| 4,538,372 | 9/1985 | Petigoretz ......................... 43/43.12 |
| 4,998,374 | 3/1991 | Barnett . |

*Primary Examiner*—Kurt Rowan
*Attorney, Agent, or Firm*—Dinnin & Dunn

[57] ABSTRACT

A trolling unit for fishing, including a weight release mechanism. The trolling unit includes a spreader to which two hooks may be attached. Once a fish takes the bait the weight release mechanism releases a weight which allows the fisherman to pull the fish to the surface without reeling in the weight with the fish.

25 Claims, 2 Drawing Sheets

TROLLING UNIT

This is a continuation of U.S. patent application Ser. No. 07/939,613, filed Sep. 2, 1992 now abandoned.

BACKGROUND OF THE INVENTION

1. Field of the Invention

The present invention relates generally to fishing devices and more particularly to a trolling unit for fishing.

2. Description of Related Art

Typically, trolling systems include a downrigger arrangement having a weight attached to a line separate from the fishing line. The fishing line is attached via a release mechanism to a downrigger line adjacent the weight and the weight is lowered to the desired fishing depth. The release mechanism releases the fishing line from the downrigger line once a fish takes the bait. Afterwards, the downrigger weight is pulled up by a separate reel assembly. While more than one line may be attached to the downrigger line prior to lowering it to the desired depth, the addition of a downrigger line, reel assembly and downrigger weight complicates the system.

In an attempt to simplify the standard downrigger system, spreader units having multiple hooks attached thereto are attached directly to a single fishing line and with the use of a weight attached to the spreader are lowered to the desired fishing depth. However, the weights used in these devices are not releasable and therefore must be reeled in with a hooked fish.

SUMMARY OF THE INVENTION

Accordingly, it is an the object of the present invention to provide a trolling unit having a spreader for separating multiple baited hooks secured to a single fishing line and a weight attached thereto which is released after a fish is hooked.

It is another object of the present invention to provide a lightweight, easily assembled and versatile trolling unit.

Briefly summarized, the present invention is a unique trolling assembly for connection to a fishing line for use with a standard fishing pole and eliminates the need for a separate downrigger assembly and downrigger weight.

In general, the present invention is a trolling unit including a spreader, the ends of which are configured such that fishing tackle for hooking a fish may be connected thereto. The trolling unit also includes a weight release mechanism, including a disposable weight, interconnecting the spreader to the fishing line.

One advantage of the present invention is that the trolling unit allows a fisherman to lower and maintain the trolling unit at a desired depth while the boat is moving forwardly. Another advantage of the present invention is that the pull of a hooked fish on the trolling unit causes the weight release mechanism to activate thus dropping or releasing the disposable weight which allows the fisherman to pull only the hooked fish to the surface.

Yet another advantage of the present invention is that the components of the trolling unit are connected using split rings, enabling the fisherman to easily replace any damaged portions of the trolling unit or vary the components and corresponding size of the unit.

Other objects, features and advantages of the present invention will become apparent upon reference to the following description and accompanying drawings.

DESCRIPTION OF THE PREFERRED EMBODIMENT(S)

Figure 1:
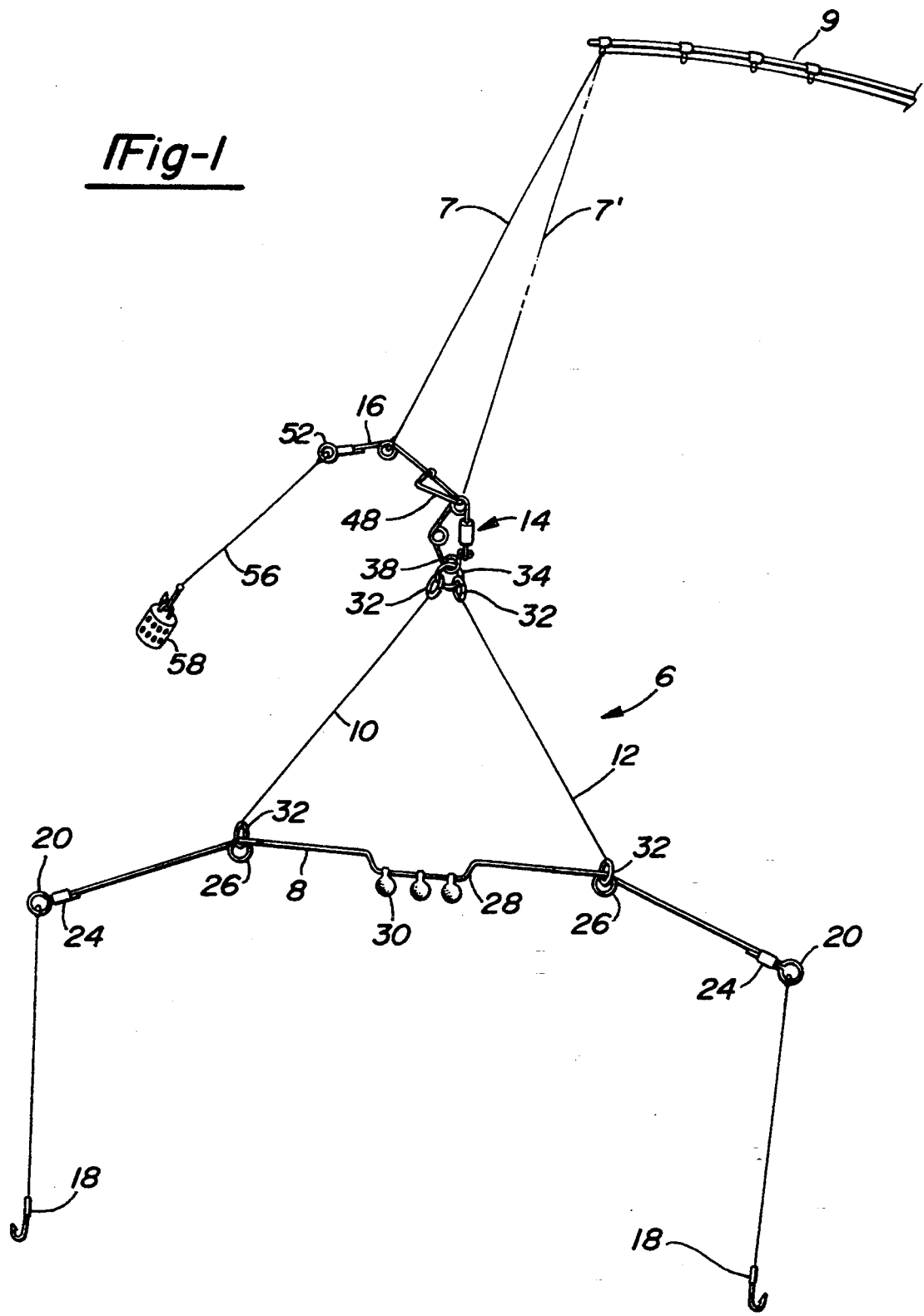
FIG. 1 is a perspective view of a trolling unit according to the present invention shown connected to a fishing line.

Referring now to FIG. 1, a trolling unit 6, according to the present invention, is attached to a line 7 of a fishing pole or rod 9. The trolling unit 6 includes a spreader 8 having two lead links or wires 10, 12 connected at one end to the spreader 8 and attached at the other end to a common split ring 34. The trolling unit 6 also includes a weight release mechanism 14 attached to the split ring 34. The trolling unit 6 further includes a main wire lead 16 connecting the weight release mechanism 14 to the fishing line 7. The main wire lead 16 may be omitted in some instances, if so, the weight release mechanism 14 is attached directly to the fishing line 7'.

Figure 4:
FIG. 4 is a side view of one end of the trolling unit of FIG. 1 prior to assembly.
Figure 5:
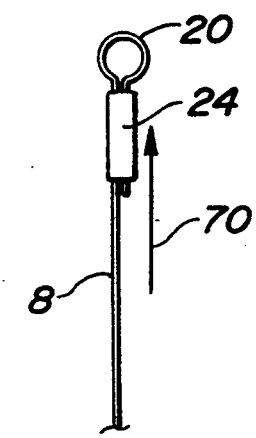
FIG. 5 is a view similar to FIG. 4 illustrating one end of the trolling unit as assembled.

The spreader 8 includes a central elongated member and an outwardly extending arm portion at each end and is, preferably, 0.041 diameter stainless steel wire having a length of twenty inches. The ends of the spreader 8 are shaped in the form of an eyelet 20 which is secured by a sleeve 24 as illustrated in FIGS. 4 and 5. Lures or baited hooks 18 are attached stands to the eyelets 20. The spreader 8 prevents the hooks 18 from becoming tangled with each other when lowering the hooks 18 to the desired depth or when trolling. It should be appreciated that the spreader 8 may be up to forty-five inches in length and have a diameter of 0.05 inches. It should also be appreciated that other lengths of diameters may be used depending upon the material used and the type of fish sought by the fisherman.

Coils 26 are formed on the spreader 8 by bending the spreader 8 over itself. To form the coils 26, the spreader 8 is bent around a post member (not shown) approximately 5°-10° past a full rotation. The coils 26 are resilient and provide a spring force in response to a force applied to the baited hooks 18 secured in the eyelets 20. As illustrated in FIG. 1, the eyelets 20 and the coils 26 are all formed in the same plane. The spreader 8 also includes an indented section 28 on which weights such as split shot 30 may be placed to ensure separation between the spreader 8 and the main wire lead 16.

The weight release mechanism 14 is attached to the spreader 8 by lead wires 10, 12 connected at one end through split rings 32 to the coils 26 on the spreader 8 and connected at the opposite end through split rings 32 to a common split ring 34 which is connected to a coil 38 of the weight release mechanism 14. When used with a twenty inch spreader 8, the lead wires 10 and 12 are approximately eight inches in length and are formed, preferably from thirty (30) lb test seven strand nylon covered wire. The ends of the lead wires 10, 12 form loops through which the split rings 32 are inserted. The weight release mechanism 14 is attached either to the main wire lead 16 by connecting the crane snap 48 to the weight release mechanism 14 or is attached directly to the fishing line 7'.

Figure 2:
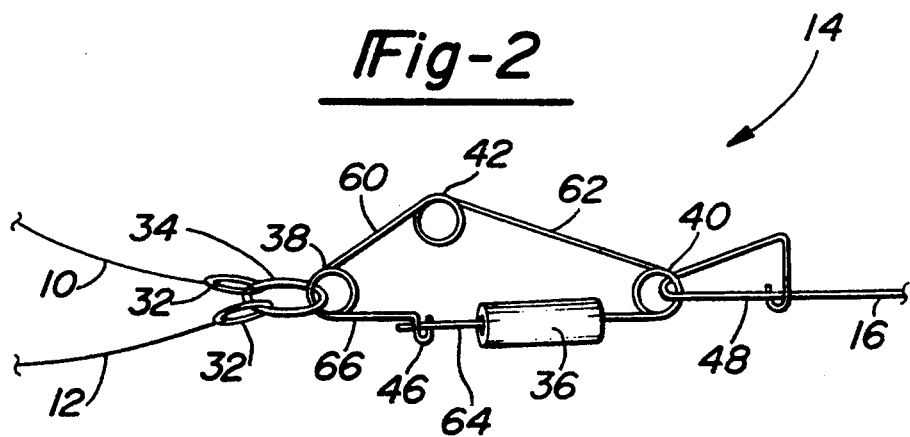
FIG. 2 is a side view of a weight release mechanism according to the present invention, of the trolling unit of FIG. 1 illustrated in a closed position and showing a disposable weight secured thereon.

Referring now to FIG. 2, the weight release mechanism 14 is shown in a closed position with the disposable weight 36 securely positioned on the weight release mechanism 14. When used with a twenty (20) inch spreader 8, the weight release mechanism 14 is formed from a single length of 0.035 or 0.041 diameter stainless steel wire bent into a substantially triangular shape having an overall length of approximately 1¼ inches. The weight release mechanism 14 includes three coils 38, 40, 42 and three leg portions 60, 62, 64. The third leg portion 64 engages a hook 46 attached to a post member 66 adjacent coil 38 to form a releasable latch. The coil 42 opposite the third leg member 64 is resilient and provides a spring force to keep the third leg member 64 in a latched or closed position. The coil 40 adjacent the third leg member 64 is also resilient and provides a spring force which urges the third leg member 64 outward once the latch is released.

Prior to latching the third leg member 64 in the hook 46, the disposable weight 36 is placed on the third leg member 64. Preferably, the disposable weight 36 is either a lead weight or is made of galvanized or iron pipe with a cement center. While the disposable weight 36 can be of any shape, preferably, the weight should be of a shape which reduces drag on the trolling unit 6 when the trolling unit 6 is pulled through the water. It should be appreciated that other disposable materials suitable for attachment to the weight release mechanism 14 may also be used.

Figure 3:
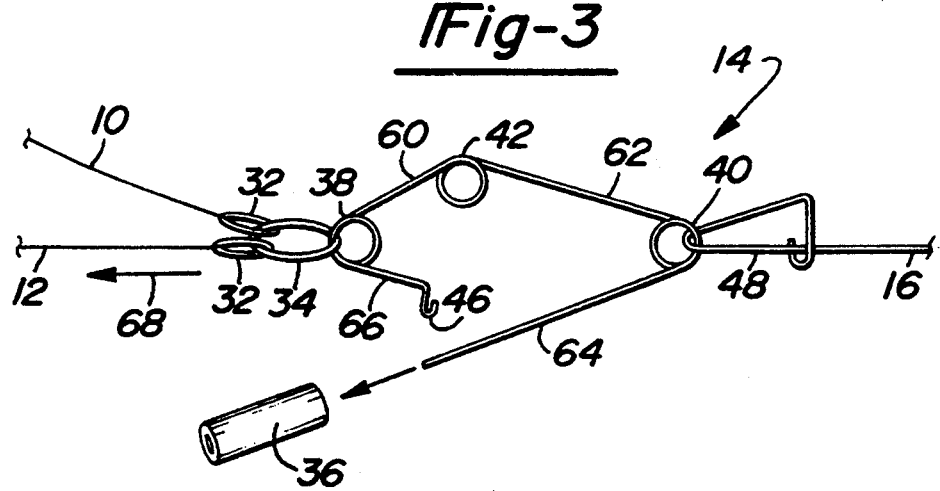
FIG. 3 is a view similar to FIG. 2 illustrating the weight release mechanism in an open position and showing the disposable weight released from the mechanism.

As shown in FIG. 3, a fish taking either of the two baited hooks 18 applies a tensile force to the weight release mechanism 14 in the direction shown by the arrow 68. When the tensile force applied overcomes the spring force provided by the coil 42 opposite the third leg member 64, the weight release mechanism 14 is stretched in the direction shown by the arrow 68 and the third leg member 64 is pulled free of the hook 46. The resiliency of the coil 40 causes the third leg member 64 to spring outward, thereby releasing the disposable weight 36. Releasing the disposable weight 36 allows a hooked fish to be brought to the surface without the additional drag created by having to pull up the disposable weight 36 with the hooked fish.

FIGS. 4 and 5 show the assembly and design of the eyelet 20. The eyelet 20 is made by bending the free end of the spreader 8 over a post member to form a substantially circular shape. A sleeve 24 is then slid over the free end in the direction shown by the arrow 70 and is crimped in place.

As illustrated in FIG. 1, the main wire lead 16 includes a single length of stainless steel wire having a diameter of 0.041 inches and an overall length of fifteen inches. An eyelet 52, similar to the eyelet 20 formed on the spreader 8, is formed on one end thereof and a crane snap assembly 48 is formed on the opposite end. Approximately ⅓ of the distance between the eyelet 52 and the crane snap 48, a coil 50 is formed by bending the main wire lead 16 over itself at approximately a 35° angle. When used, the main wire lead 16 is attached through the crane snap 48 to the coil 40 on the weight release mechanism 14. The fishing line 7 is attached to the main wire lead 16 at the coil 50. A third line 56 is attached at the eyelet 52 and used to tow an attractor 58 or a dodger or flasher. It should be appreciated that a third lure may be used where legal.

By using a trolling unit of this type, a fisherman may lower at least two baited hooks or lures to a desired depth with a weighted trolling unit attached solely to the fishing line. Once a fish is hooked, a weight release mechanism will release the weight allowing the fish to be brought to the surface without dragging or bringing up the extra weight.

It is to be understood that though preferred embodiments of the present invention have been described in detail, there is modifications, alternations and changes may be made without departing from the spirit and scope of the present invention as defined in the claims.

I claim:

1. A trolling unit for attachment to a fishing line comprising:
    a spreader, said spreader including a central elongated member and two outwardly extending arm portions configured such that fishing tackle for hooking a fish may be connected to said arm portions;
    a self-releasing weight release mechanism interconnecting said fishing line and said spreader, said self-releasing weight release mechanism connected on one end to said fishing line and connected on an opposite end to said spreader, said weight release mechanism operative to release a weight attached thereto when a force applied to said fishing line exceeds a threshold value wherein said self-releasing weight mechanism remains connected to said fishing line and said spreader after said weight is released from said weight release mechanism.

2. A trolling unit as set forth in claim 1 including at least two strands adapted for connection to said fishing tackle, said spreader extending transversely between said strands and attached thereto.

3. A trolling unit as set forth in claim 1 wherein said weight release mechanism includes a disposable weight releasably secured thereto.

4. A trolling unit as set forth in claim 3 wherein said weight release mechanism includes a release means for releasing said disposable weight when a force applied to said weight release mechanism exceeds a certain threshold level.

5. A trolling unit as set forth in claim 4 wherein said force is a tensile force.

6. A trolling unit as set forth in claim 1 wherein said weight release mechanism includes a resilient member and a latch such that a force applied to the resilient member releases the latch thereby releasing the weight.

7. A trolling unit as set forth in claim 1 wherein said spreader includes a central elongated member having a longitudinal axis and an outwardly extending elongated arm portion having a longitudinal axis, the longitudinal axis of said arm portion skewed with respect to the longitudinal axis of said center member.

8. A trolling unit as set forth in claim 7 wherein the longitudinal axis of said arm portion is skewed at an angle between 5° and 10°.

9. A trolling unit as set forth in claim 1 including a plurality of links having first and second ends, said first ends attached to said spreader at a plurality of spaced apart positions and said second ends attached to said weight release mechanism and a weight release means for releasing said disposable weight when a force exceeding a threshold value is applied to said weight release mechanism.

10. A trolling unit as set forth in claim 9 wherein said force is a tensile force.

11. A trolling unit for attachment to a fishing line comprising:
a spreader configured such that fishing tackle for hooking a fish may be connected to said spreader;
a weight release mechanism interconnecting said fishing line and said spreader;
said weight release mechanism including a resilient member and a latch such that a force applied to the resilient member releases the latch thereby releasing the weight; and
said resilient member comprising a single length of resilient material formed in a substantially triangular shape having first, second and third leg members, said latch connecting two of said leg members and releasably securing said weight to said weight release mechanism such that releasing the latch releases the weight.

12. A trolling unit as set forth in claim 11 wherein said latch is positioned on said third leg member and a spring member is positioned at a vertex of the triangle opposite said third leg member to bias the latch to a closed position.

13. A trolling unit for attachment to a fishing line comprising:
a spreader configured such that fishing tackle for hooking a fish may be connected to said spreader;
a weight release mechanism interconnecting said fishing line and said spreader; and
a plurality of links having first and second ends, said first ends attached to said spreader at spaced apart positions and said second ends attached at a common point to form a triangle shape, whereby said weight release mechanism interconnected on one end with said common point and with said fishing line at the opposite end thereof.

14. A weight release mechanism for use in connecting a trolling unit to a fishing line comprising:
a frame;
a disposable weight releasably secured to said frame and a release means for releasing said weight from said frame when a force applied to said weight release mechanism exceeds a threshold value; and
said frame is a single length of material formed into a substantially triangular shape having first, second and third leg members, said release means is positioned on one of said leg members and includes a latch assembly, said disposable weight is disposed on one of said leg members and releasable from said frame upon activation of said release means.

15. A weight release mechanism for use in connecting a trolling unit to a fishing line comprising:
a frame;
a disposable weight releasably secured to said frame and a release means for releasing said weight from said frame when a force applied to said weight release mechanism exceeds a threshold value; and
said frame comprises interconnected first, second and third leg members, said first leg member resiliently connected at one end to one end of said second leg member, said second leg member being resiliently connected at the other end to said third leg member, and said first leg member resiliently connected at its other end to the other end to said third leg member, said third leg member including a hook and latch assembly wherein said latch cooperates with said hook to releasably secure said disposable weight.

16. A trolling unit for attachment to a fishing line comprising:
a substantially rigid spreader having first and second ends, including eyelets formed at said first and second ends;
said spreader further having coils formed thereon;
a plurality of link members having first and second ends, said first ends attached to said coils and said second ends attached at a common point;
a weight release mechanism connected to said common point including first, second and third leg members interconnected in a substantially triangular shape;
a disposable weight secured to said weight release mechanism; and
a release means on said weight release mechanism for releasing said disposable weight from said weight release mechanism.

17. A trolling unit as set forth in claim 16 wherein said release means includes a hook and latch assembly.

18. A trolling unit as set forth in claim 16 including a main wire lead;
said main wire lead having a crane snap on one end, an eyelet on said opposite end, and a coil formed thereon between said eyelet and said crane snap wherein said fishing line is attached to said coil and said crane snap is used to attach said main wire lead to said weight release mechanism.

19. A trolling unit for attachment to a fishing line comprising:
a spreader configured such that fishing tackle for hooking a fish may be connected to said spreader;
a weight release mechanism interconnecting said fishing line and said spreader; and
a main wire lead;
said main wire lead having a crane snap on one end, an eyelet on said opposite end, and a coil formed thereon between said eyelet and said crane snap wherein said fishing line is attached to said coil and said crane snap is used to attach said main wire lead to said weight release mechanism.

20. A trolling unit for attachment to a fishing line comprising:
a spreader configured such that fishing tackle for hooking a fish may be connected to said spreader, said spreader including a central elongated member and two outwardly extending arm portions, said central elongated member having an indented section forming a weight pocket said indented section having two leg portions skewed with respect to a longitudinal axis of said central elongated member and a central body portion connecting said leg portions such that said central body is offset from said central elongated member; and
a weight disposed on said indented section.

21. A trolling unit as set forth in claim 20 wherein said arm portions and said central elongated member are disposed in a planar configuration; and
said leg portions extend outward and are skewed with respect to said planar configuration such that said indented section acts to stabilize the spreader and counteract rotation of said spreader about said central elongated member during use of said spreader.

22. A trolling unit for attachment to a fishing line comprising:

a spreader configured such that fishing tackle for hooking a fish may be connected to said spreader, said spreader being formed from a single wire having a central elongated portion and two outwardly extending arm portions disposed in a planar configuration, said central elongated member further including an indented section, said indented section having two leg portions skewed with respect to a longitudinal axis of said central elongated member and a central body portion connecting said leg portions such that said central body is offset from said central elongated member forming a weight pocket wherein said indented section is oriented substantially transverse to said planar configuration of said spreader; and a weight attached to said indented section such that said weight and said indented section form a moment arm which counteracts rotation of said spreader about said central elongated member.

23. A trolling unit for attachment to a fishing line comprising:

a spreader configured such that fishing tackle for hooking a fish may be connected to said spreader, said spreader including a central elongated member, said central elongated member including an indented section, said indented section having two leg portions skewed with respect to a longitudinal axis of said central elongated member and a central body portion connecting said leg portions such that said central body portion is offset from said central elongated member;

arm portions, each arm portion having first and second ends;

spring means interconnecting said first ends to said central elongated member; and eyelets attached to said second ends.

24. A trolling unit as set forth in claim 23 wherein said spreader is formed of a one-piece, integral member.

25. A trolling unit as set forth in claim 23 wherein said spring means includes a coil and a pair of lead wires, each lead wire having first and second ends, said first ends attached to said coils and said second ends attached together such that when the lead wires are pulled taunt, the lead wires and the central elongated member form a triangular shape.

* * * * *